(12) United States Patent
Li et al.

(10) Patent No.: US 8,483,761 B2
(45) Date of Patent: Jul. 9, 2013

(54) SINGULAR VALUE DECOMPOSITION BEAMFORMING FOR A MULTIPLE-INPUT-MULTIPLE-OUTPUT COMMUNICATION SYSTEM

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 11/334,329

(22) Filed: Jan. 18, 2006

(65) Prior Publication Data

US 2007/0167192 A1 Jul. 19, 2007

(51) Int. Cl.
H04M 1/00 (2006.01)
H04M 3/42 (2006.01)
H04B 15/00 (2006.01)
H04B 1/06 (2006.01)

(52) U.S. Cl.
USPC ............. 455/562.1; 455/414.1; 455/63.4; 455/273

(58) Field of Classification Search
USPC ........................................... 455/561.2
See application file for complete search history.

(56) References Cited

U.S. PATENT DOCUMENTS

| | | | |
|---|---|---|---|
| 2003/0068994 A1 | 4/2003 | Sayeed et al. | |
| 2004/0156339 A1* | 8/2004 | Urquhart et al. | 370/334 |
| 2004/0190636 A1 | 9/2004 | Oprea | |
| 2005/0237920 A1* | 10/2005 | Howard et al. | 370/208 |
| 2005/0249151 A1* | 11/2005 | Takano | 370/328 |
| 2006/0071807 A1* | 4/2006 | Sadowsky | 340/825.72 |
| 2006/0120478 A1 | 6/2006 | Kim et al. | |
| 2006/0194544 A1* | 8/2006 | Struckman | 455/67.11 |
| 2006/0270352 A1* | 11/2006 | Webster et al. | 455/63.4 |
| 2007/0002734 A1* | 1/2007 | Kim et al. | 370/229 |
| 2007/0015543 A1* | 1/2007 | Ojard | 455/562.1 |
| 2007/0155353 A1* | 7/2007 | Shapira et al. | 455/273 |

FOREIGN PATENT DOCUMENTS

| | | |
|---|---|---|
| CN | 1599276 A | 3/2005 |
| TW | 200733606 A | 9/2007 |
| WO | 2004077778 A1 | 9/2004 |
| WO | WO-2004077778 A1 | 9/2004 |
| WO | 2007/084405 A1 | 7/2007 |

OTHER PUBLICATIONS

Ying-Chang, L. et al., "Random Beamforming for MIMO Systems with Multiuser Diversity", *Personal, Indoor and Mobile Radio Communications, 15th IEEE International Symposium* on Barcelona Spain, vol. 1, (Sep. 5, 2004),290-294.

(Continued)

*Primary Examiner* — Lester Kincaid
*Assistant Examiner* — Andy Gu
(74) *Attorney, Agent, or Firm* — Cool Patent, P.C.; Kenneth J. Cool; Joseph P. Curtin

(57) ABSTRACT

For one embodiment, a MIMO (Multiple-Input-Multiple-Output) communication system in which a first sequence of beamformed signals is transmitted, a beamformed channel is observed in response to transmission of the first sequence of beamformed signals, a QR decomposition of the observed beamformed channel is performed to provide a unitary matrix, and a second sequence of beamformed signals is transmitted using as a beamformer the unitary matrix. Other embodiments are described and claimed.

23 Claims, 6 Drawing Sheets

OTHER PUBLICATIONS

Bartolome, D. et al., "A Unified Fairness Framework in Multi-Antenna Multi-User Channels", *Electronics, Circuits and Systems, 11th IEEE International Conference* on Tel Aviv, Israel, (Dec. 13, 2004),81-84.

Daniel, B. W., et al., "Environmental Issues for MIMO Capacity", *IEEE Transactions on Signal Processing*, vol. 50 (9), (Sep. 9, 2002).

International Search Report for application No. PCT/US2007/000911, (Jun. 29, 2007), 1-15.

Ying-Chang Liang et al., Random beamforming for MIMO systems with multiuser diversity, Personal Indoor and Mobile Radio Communications, 2004. PIMRC 2004, 15th IEEE International Symposium on Barcelona, Spain 508 Sep. 2004, Piscataway, NJ, USA, IEEE, vol. 1, Sep. 5, 2004, pp. 290-294, XP010754605, ISBN: 0-7803-8523-3.

Bartolome D et al., A unified fairness framework in multi-antenna multi-user channels, Electronics, Circuits and Systems, 2004. Proceedings of the 2004 11th IEEE International Conference on Tel Aviv, Israel Dec. 13-15, 2004, Piscataway, NJ, USA, IEEE, Dec. 13, 2004, pp. 81-84, XP010774733, ISBN 0-7803-8715-5.

Daniel W Bliss et al., Environmental Issues for MIMO Capacity, IEEE Transactions on Signal Processing, IEEE Service Center, New York, NY, US, vol. 50, No. 9, Sep. 2002, XP011080219, ISSN: 1053-587X.

Bliss, Daniel W. et al., "Environmental Issues for MIMO Capacity", IEEE Transactions on Signal Processing, vol. 50, No. 9, Sep. 2002, 2128-2142 pgs.

Office Action Received for China Patent Application No. 200780003254.7, Mailed on Aug. 24, 2011, 5 pages of Office Action and 5 pages of English Translation.

Office Action Received for China Patent Application No. 200780003254.7, Mailed on Aug. 3, 2012, 3 pages of Office Action and 1 page of English Translation.

Office Action Received for European Patent Application No. 07709787.1, Mailed on Jul. 11, 2011, 5 pages of Office Action.

Office Action Received for Taiwan Patent Application No. 96101622, Mailed on May 6, 2011, 7 pages of Office Action and 8 pages of English Translation.

International Preliminary report on Patentability Receive for PCT Application No. PCT/US2007/000911, Mailed on Jul. 31, 2008, 10 pages.

Office Action received for Chinese Application No. 200780003254.7 mailed on Dec. 20, 2012, 6 pages of English Translation.

Notice of Allowance for Taiwanese Application No. 96101622 mailed on Sep. 21, 2011, 2 pages of English Translation.

\* cited by examiner

SINGULAR VALUE DECOMPOSITION BEAMFORMING FOR A MULTIPLE-INPUT-MULTIPLE-OUTPUT COMMUNICATION SYSTEM

FIELD

Embodiments of the present invention relate to wireless communication, and more particularly, to wireless communications employing antenna beamforming.

BACKGROUND

Multi-path wireless channels are capable of large channel capacities, and may be properly exploited through the use of a multiple-input-multiple-output MIMO communication system. A MIMO system employs multiple transmit antennas and multiple receive antennas. Standard IEEE 802.16e, sometimes referred to as Mobile Worldwide Interoperability for Microwave Access (Mobile WiMAX), supports MIMO antenna technology. Future wireless networks will also support MIMO antenna technology. For example, TGn Sync is a multi-industry group working to introduce a unified proposal for the next generation of high performance wireless networks. This proposal was developed under the guidelines of the IEEE Standards Association and submitted to the IEEE 802.1 In Task Group N (TGn). One of the goals of the TGn Sync proposal is to enable MIMO Spatial Division Multiplexing to enable reliable transmission speeds of up to 315 megabits per second (Mbps) with two antennas, and up to 630 Mbps with larger systems employing more than two antennas.

A MIMO communication system may take advantage of beamforming to not only increase the overall antenna gain, but also to reduce interference between the received multi-path signals at the receiver. Currently, two MIMO technologies are under consideration: open-loop and closed-loop technologies. It is found that closed-loop MIMO technology outperforms open-loop MIMO by 4 to 10 decibels (dB). A promising scheme for closed-loop MIMO technology is Singular-Value-Decomposition (SVD) transmit beamforming.

SVD beamforming is a powerful beamforming technique showing promising results in MIMO communication systems. SVD beamforming requires performing the singular value decomposition of a channel matrix, in which the channel matrix represents the physical channel, transmitters, and receivers. SVD beamforming generally requires performing an iterative algorithm by a circuit, in which the circuit may be a programmable circuit. Performing such an iterative algorithm consumes both die space and power.

Some existing receivers for open-loop MIMO technology employ minimum mean square error receivers, or zero-forcing receivers. These receivers solve a least-squares criterion. Often, a QR decomposition, or other type of decomposition employing a unitary transformation, is applied to solve the least-squares criterion. It would be desirable to utilize existing QR-decomposition circuits to perform the singular value decomposition of the channel matrix.

DESCRIPTION OF EMBODIMENTS

Figure 1:
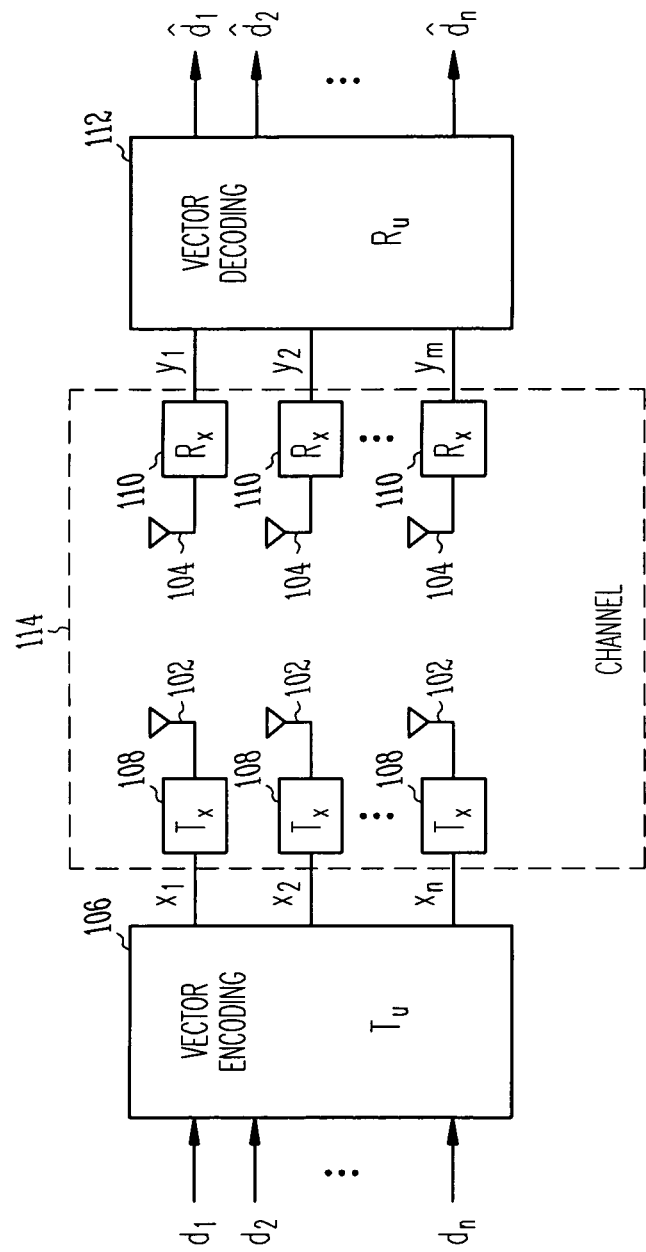
FIG. 1 illustrates a one-way channel of a MIMO system.

FIG. 1 is a high-level system diagram of a portion of a MIMO system utilizing n transmit antennas 102 and m receive antennas 104. In particular, $d_i$, i=1, . . . , n, are n complex-valued data quantities to be transmitted. These data quantities may arise by de-multiplexing one or more data stream into n data streams, in which coding may have been applied. Vector Encoding functional unit 106 encodes $d_1$, i=1, . . . , n, into the n complex-valued quantities $x_i$, i=1, . . . , n. Defining $\bar{d}_u$ as a n-dimensional column vector having components $[\bar{d}_u]_i = d_i$, i=1, . . . , n, and defining $\bar{x}_u$ as a n-dimensional column vector having components $[\bar{x}_u]_i = x_i$, i=1, . . . , n, one may write the vector encoding as $$\bar{x}_u = T_u \bar{d}_u,$$

in which $T_u$ denotes a complex-valued n-by-n matrix. (The significance of the subscript u will be discussed later.)

The complex-valued quantities $x_i$, i=1, . . . , n, represent the in-phase and quadrature components of a baseband signal, such as a voltage signal, to be transmitted over a channel. Functional units 108 (e.g., transmitters) indicate modulators for up-converting a baseband signal to an RF(radio-frequency) signal before transmission by antennas 102, although the scope of the embodiment is not limited in this regard.

Receivers 110 down-convert the received signals provided by antennas 104 into the m complex-valued baseband signals $y_i$, i=1, . . . , m. Vector Decoding functional unit 112 indicates that the m complex-valued baseband signals $y_i$, i=1, . . . , m, are decoded into the n complex-valued baseband signals $\hat{d}_i$, i=1, . . . , n. Defining $\hat{\bar{d}}_u$ as an n-dimensional column vector having components $[\hat{\bar{d}}_u]_i = \hat{d}_i$, i=1, . . . , n, and defining $\bar{y}_u$ as an m-dimensional column vector having components $[\bar{y}_u]_i = y_i$, i=1, . . . , m, one may write the vector decoding as $$\hat{\bar{d}}_u = R_u \bar{y}_u,$$

in which $R_u$ denotes a complex-valued n-by-m matrix. It is desirable that the quantities $\hat{d}_i$, i=1, . . . , n, are in some sense a "good" estimate of the transmitted quantities $d_i$, i=1, . . . , n.

There are various ways to define a communication channel. In FIG. 1, a communication channel may be defined to include the components within dashed box 114. For this communication channel, the channel inputs are $x_i$, i=1, . . . , n, and the channel outputs are $y_i$, i=1, . . . , m. If Vector Encoding 106 and transmitters 108 are associated with a mobile station, and Vector Decoding 112 and receivers 110 are associated with an access point, then the channel defined by box 114 may be referred to as the uplink channel. If on the other hand, Vector Encoding 106 and transmitters 108 are associated with an access point, and Vector Decoding 112 and receivers 110 are associated with a mobile station, then the channel defined by box 114 may be referred to as the downlink channel Although FIG. 1 shows only a one-way channel, in practice there is a downlink channel in addition to an uplink channel. For convenience, the channel in FIG. 1 will be referred to as an uplink channel. This is the reason for using the subscript u is the above discussion.

Although the above example is described with respect to a mobile station and an access point, the methods and apparatuses described herein may be readily applicable to other communication devices, such as subscriber stations and base stations, for example.

Figure 2B:
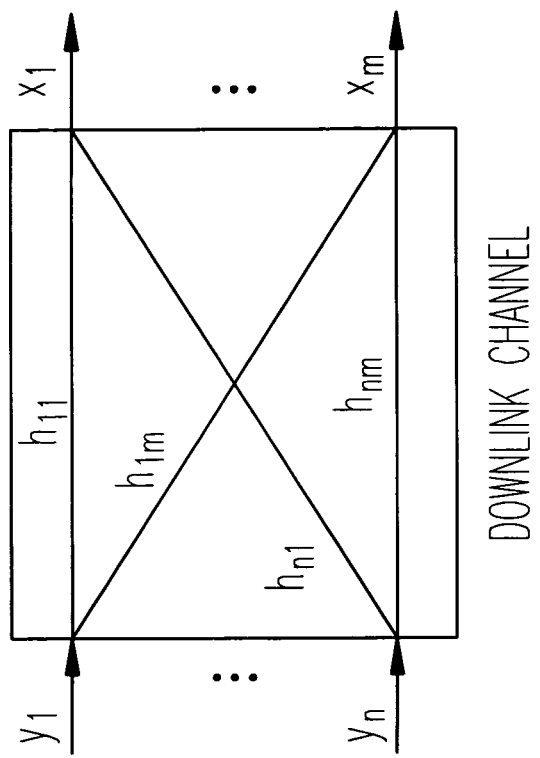
FIGS. 2A and 2B illustrate the uplink and downlink channels for a MIMO system, respectively.
Figure 2A:
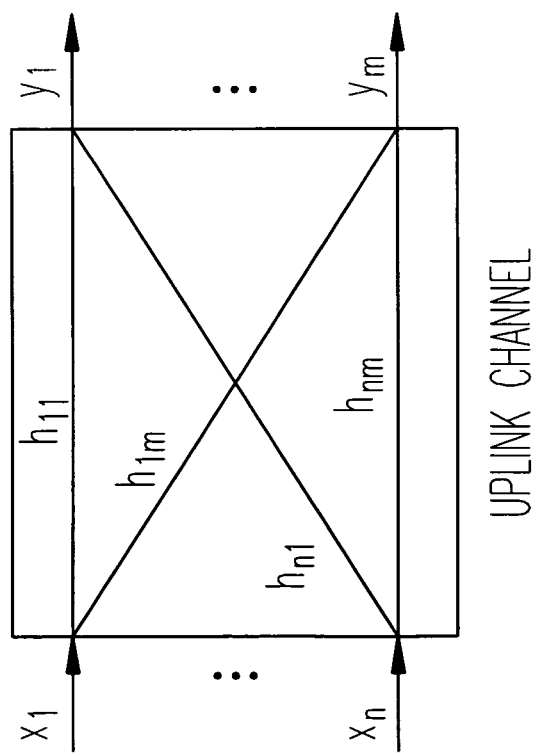

The uplink channel defined by box 114 may be abstracted as shown in FIG. 2A. For simplicity, the uplink channel depicted in FIG. 2a is a stationary, noiseless channel. In practice, however, there will be noise sources, and the channel transfer function may be fading. In FIG. 2A, $h_{ij}$, i=1, . . . , n; j=1, . . . , m, are complex-valued multipliers representing the overall gains due to the gains of the transmit antennas, receive antennas, transmitters, and receivers. That is, $h_{ij}$ is the product $(Tx_i)(TG_{ij})w_{ij}(RG_{ij})(Rx_j)$, in which $Tx_i$ is the gain for the transmitter for symbol $x_i$; $TG_{ij}$ is the antenna gain for the transmit antenna associated with $x_i$ in the direction toward the receive antenna associated with symbol $y_j$; $RG_{ij}$ is the antenna gain for the receive antenna associated with symbol $y_j$ for a signal received from the direction of the antenna associated with symbol $x_i$; and $Rx_j$ is the gain for the receiver for the symbol $x_j$, and $w_{ij}$ is the response of the physical transmission medium between transmit antenna i and receive antenna j. Defining the n-by-m downlink channel matrix H to have components $[H]_{ij}=h_{ij}$, i=1, . . . , n; j=1, . . . , m, the input-output relationship defined by the uplink channel matrix $H^T$ is $$\bar{y}_u = H^T \bar{x}_u,$$

in which $^T$ denotes transpose. Note that $H^T$ is an m-by-n matrix.

We shall use the notation in which the symbol x with an appropriate subscript refers to a transmitted signal, and the symbol y with an appropriate subscript is a received signal. Particularly, $\bar{x}_u$ will refer to the n-dimensional vector of transmitted signals for the uplink channel; $\bar{x}_d$ will refer to the m-dimensional vector of transmitted signals for the downlink channel; $\bar{y}_u$ will refer to the m-dimensional vector of received signals for the uplink channel; and $\bar{y}_d$ will refer to the n-dimensional vector of received signals for the downlink channel. We shall also use the notation that the symbol d with an appropriate subscript will refer to data that is to be transmitted. That is, $\bar{d}_u$ is the n-dimensional data vector to be transmitted for the uplink channel, and $\bar{d}_d$ is the m-dimensional data vector to be transmitted for the downlink channel.

In general, the downlink channel matrix, in which $x_i$, . . . i=1, . . . , m, are now being transmitted and $y_i$, i=1, . . . , n, are received, is different from H. This is so because for the downlink channel, receivers are used to generate the $y_i$, i=1, . . . , n, instead of transmitters 108, and transmitters are used to generate the $x_i$, i=1, . . . , m, instead of receivers 110, and as a result, the overall channel gains may be different. If, however one assumes that the channel is calibrated to take into account the differences in transmitter and receiver gains for uplink and downlink communication, then the same channel gains $h_{ij}$, i=1, . . . , n; j=1, . . . , m, as indicated in FIG. 2A also hold for the downlink channel of FIG. 2B. With this assumption, the two-way channel is said to be reciprocal, and the input-output relationship for the downlink channel is given by $$\bar{y}_d = H\bar{x}_d.$$

To perform SVD beamforming, the SVD of the channel matrix is computed. Consider the uplink channel of FIG. 2A with channel matrix $H^T$. The SVD of $H^T$ is $$H^T = U_u \Sigma_u V_u^H,$$

in which $^H$ denotes complex conjugate transpose (the Hermitian operator), $U_u$ is an m-by-m unitary matrix, $\Sigma_u$ is an m-by-n diagonal matrix in which the diagonal values are the singular values of $H^T$, and $V_u$ is an n-by-n unitary matrix. Once the SVD of the channel matrix is computed, SVD beamforming is formed by multiplying the transmitted data vector $\bar{d}_u$ by $V_u$. That is, Vector Encoding 106 is chosen in which $T_u = V_u$, so that $$\bar{x}_u = V_u \bar{d}_u.$$

Using the above SVD beamformer and SVD of $H^T$, the received signal vector for the uplink channel, $\bar{y}_u$, is:

$$\bar{y}_u = H^T \bar{x}_u = H^T V_u \bar{d}_u = U_u \Sigma_u V_u^H V_u \bar{d}_u = U_u \Sigma_u \bar{d}_u,$$

in which we have used the unitary property $V_u^H V_u = I$. If now Vector Decoding 112 multiplies $\bar{y}_u$ by $U_u^H$, that is $R_u = U_u^H$ in Vector Decoding 112, then $\hat{d}_u$ is given by $$\hat{d}_u = R_u \bar{y}_u = U_u^H \bar{y}_u = U_u^H U_u \Sigma_u \bar{d}_u = \Sigma_u \bar{d}_u.$$

Because $\Sigma_u$ is diagonal, we see that "mixing" of the different transmitted signal components due to the multipath uplink channel has been removed by employing SVD beamforming. That is, $[\hat{d}_u]_i = \sigma_i [\bar{d}_u]_i$, i=1, . . . , n, in which $\sigma_i$, i=1, . . . , n, are the singular values.

In the above discussion, we have assumed a noiseless channel. If zero-mean, stationary Gaussian noise with covariance matrix R (not to be confused the $R_u$ in Vector Decoding 112) is assumed to be added to the uplink channel, then because of the unitary property of $U_u$, we have $\hat{d}_u = \Sigma_u \bar{d}_u + \bar{n}_u$, in which $\bar{n}_u$ is Gaussian with covariance matrix R. Then, we see that the signal-to-noise ratio for each component of the estimate vector $\hat{d}_u$ depends upon the singular values as well as R.

The above SVD of $H^T$ requires knowledge of $H^T$. The columns of the channel matrix $H^T$ may easily be observed by transmitting such that only one component of $\bar{x}_u$ is non-zero. For example, if the first component of $\bar{x}_u$ were 1 and all the other components were zero, then $\bar{y}_u$ would be the first column of $H^T$.

For the downlink channel, SVD beamforming is performed in the same way, except now the channel matrix is H instead of $H^T$. We can write the SVD of H for the downlink channel as $H = U_d \Sigma V_d^H$, then, SVD beamforming for the downlink channel is $$\bar{x}_d = V_d \bar{d}_d.$$

By simple matrix manipulation, we have $V_d = U_u$. Clearly, there is no conceptual difference between SVD beamforming for the uplink channel and SVD beamforming for the downlink channel. In describing the embodiments, we may consider forming the SVD of either H or $H^T$. Without loss of generality, we describe the embodiments as performing the SVD of H.

Embodiments of the present invention perform the SVD of the channel matrix H by performing QR decompositions distributed among the two communicating devices, e.g., a mobile station and an access point. (As is well known in linear algebra and numerical analysis, the QR decomposition of a matrix A is A=QR, in which Q is unitary and R is upper diagonal. Various methods, such as Gram-Schmidt or Householder transformations, may be used to perform a QR decomposition.) Because SVD involves an iterative process, a finite number of QR decompositions are performed, yielding an approximation to the SVD of the channel matrix.

Figure 3:
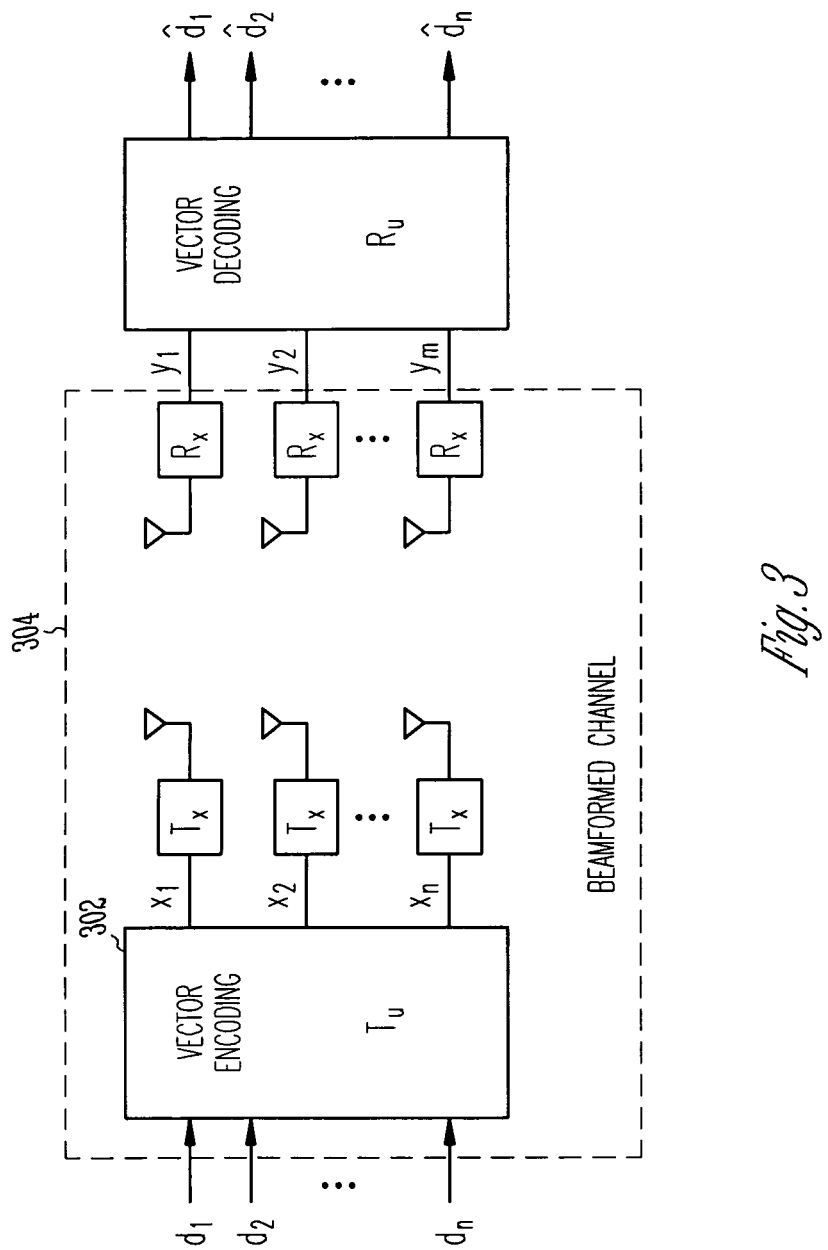
FIG. 3 illustrates a beamformed channel.

Before describing the embodiments, it is useful to define a "beamformed channel." In FIG. 3, box 304 defines the beamformed uplink channel, formed by considering Vector Encoding functional unit 302 as part of the uplink channel. Vector Encoding 302 is the beamformer. By including Vector Encoding 302 within the definition of the beamformed uplink channel, the input signals to the beamformed channel are now $d_i$, i=1, ..., n. The input-output relationship of the beamformed uplink channel in FIG. 3 is $$\bar{y}_u = H^T T_u \bar{d}_u.$$

For the downlink channel, the input-output relationship of the beamformed downlink channel is given as $$\bar{y}_d = H T_d \bar{d}_d.$$

Generally stated, a beamformed channel includes the beamformer within the definition of the channel.

A beamformed channel may be observed with the same method as discussed earlier with respect to the channel, but now the components of $\bar{d}_u$ or $\bar{d}_d$ are manipulated so that the receiving communication device observes the beamformed channel. For example, the columns of the beamformed channel matrix $H^T T_u$ may easily be observed by transmitting such that only one component of $\bar{d}_u$ is non-zero. For example, if the first component of $\bar{d}_u$ were 1 and all the other components were zero, then $\bar{y}_u$ would be the first column of $H^T T_u$. After n transmissions $\bar{d}_u(i)$, i=1, ..., n, where $[\bar{d}_u(i)]_j = \delta_{ij}$, all n columns of $H^T T_u$ are observed. ($\delta_{ij}$ is the Kronecker delta function.) In practice, the observations may be noisy, so that only an estimate of $H^T T_u$ is actually observed.

It is not necessary that $[\bar{d}_u(i)]_j = \delta_{ij}$ be transmitted to observe the beamformed channel $H^T T_u$. More generally, to observe the beamformed channel $H^T T_u$, $\bar{d}_u(i)$, i=1, ..., N, may be transmitted, in which N≥n and the matrix $D_u(N) = [\bar{d}_u(1) d(2) ... \bar{d}_u(N)]$ is of rank n, in which $\bar{d}_u(i)$, i=1, ..., N, are considered as column vectors and the columns of $D_u(N)$ are composed of the $\bar{d}_u(i)$, i=1, ..., N. The set of data vectors $\bar{d}_u(i)$, i=1, ..., N, are known to both the transmitter and receiver, and may be generated by an algorithm. The received signal vectors $\bar{y}_u(i)$, i=1, ..., N, in response to the $\bar{d}_u(i)$, i=1, ..., N, may be arranged as an observation matrix $Y_u(N) \equiv [\bar{y}_u(1) \bar{y}_u(2) ... \bar{y}_u(N)]$, in which $\bar{y}_u(i)$, i=1, ... N, are viewed as column vectors. In general, the column vectors making up the observation matrix $Y_u(N)$ are processed to provide an estimate of the beamformed channel $H^T T_u$. This processing is usually, but not necessarily, in the form of performing a linear combination on the columns of $Y_u(N)$. This processing may be represented by post-multiplying $Y_u(N)$ by a matrix, say P, which is a function of $D_u(N)$. The matrix P is determinable because $\bar{d}_u(i)$, i=1, ..., N, is known to both the transmitter and receiver.

For a noiseless channel, $Y_u(N) = H^T T_u D_u(N)$, and it follows that $$Y_u(N) D_u^H(N) [D_u(N) D_u^H(N)]^{-1} = H^T T_u.$$

The quantity $D_u^H(N)[D_u(N)D_u^H(N)]^{-1} = H^T T_u$ is to be recognized as the pseudo-inverse of $D_u(N)$, which may be written as $D_u^\#(N) \equiv D_u^H(N)[D_u(N)D_u^H(N)]^{-1}$. Consequently, for a channel with noise, an estimate of the beamformed channel in the uplink direction, which may be referred to as the observed beamformed channel in the uplink direction, may be taken as $Y_u(N) D_u^\#(N)$. Note that for the special case in which N=n and $[\bar{d}_u(i)]_j = \delta_{ij}$, we have $D_u(N) = I_n$, the n-by-n identity matrix, so that the observed beamformed channel is simply the observation matrix $Y_u(N)$. A similar discussion applies to the downlink channel. Other embodiments may use matrices other than the pseudo-inverse of $D_u(N)$.

Figure 4:
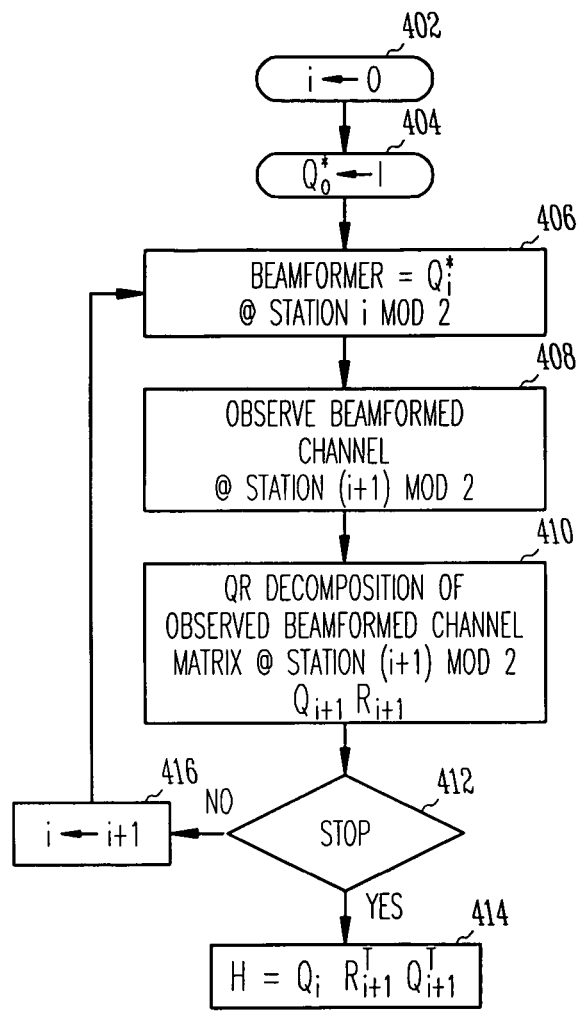
FIG. 4 is a flow-diagram illustrating an embodiment of the present invention.

A flow diagram illustrating an embodiment is shown in FIG. 4, in which two stations, station 0 and station 1, indicate the two communication devices. The communication channel for station 0 transmitting to station 1 is assumed to have the channel matrix H, and the communication channel for station 1 transmitting to station 0 is assumed to have the channel matrix $H^T$. For simplicity of discussion, assume that station 0 has m transmit antennas and m receive antennas, and that station 1 has n transmit antennas and n receive antennas.

In FIG. 4, block 402 initializes an index i to zero and initializes a matrix $Q^*_o$ to the identity matrix. The matrix $Q^*_o$ is an m-by-m matrix, so that in block 404, $Q^*_o$ is initialized to an m-by-m identity matrix. In general, matrices with an index i such that 0=i mod2 are m-by-m matrices, and matrices with an index i such that 1=i mod2 are n-by-n matrices. Here, * denotes complex conjugation.

In block 406, the beamformer at station i mod2 is set to $Q^*_i$, and at block 408, the resulting beamformed channel is observed at station (i+1)mod2. (Note that for i=0, the beamformer $Q^*_o$ is the identity matrix, so that observing the beamformed channel is the same as observing the channel.) After the beamformed channel is observed in block 408, a QR decomposition is performed on the observed beamformed channel matrix to yield $Q_{i+1} R_{i+1}$ in block 410. A stopping function is applied in block 412. This stopping function may be simple, such as stopping after the index i has reached some fixed integer. Or, a goodness of criterion may be applied, where for example the off-diagonal elements of $R_{i+1}$ are compared to the diagonal elements of $R_{i+1}$ and the iterations are stopped if $R_{i+1}$ is sufficiently diagonal. Any number of goodness criteria may be devised for the stopping function. Other embodiments may not use a stopping function. For example, the iterations may be performed in an open-ended fashion as long as there are time and processing resources available.

If the iterations are stopped in block 412, then block 414 indicates that the channel matrix H is factored into H= $Q_i R_{i+1}{}^T Q_{i+1}{}^T$. As is well known, iterative QR techniques may be performed to approximate the SVD. As a result, embodiments of the present invention utilize this factorization as an approximation to the SVD of H. This approximation improves as the number of iterations increase.

If the iterations are not stopped in block 412, then control is brought to block 416, where the index i is incremented by one, and control is then brought back to block 406.

Note that the SVD is accomplished by a cooperative procedure between two communication devices. It is pedagogically useful to consider in more detail the flow diagram of FIG. 4 for several iterations, and for which station 0 is an access point (AP) and station 1 is a mobile station (MS). In this case, the communication channel for a MS transmitting data to a AP is the uplink channel, and the communication channel for a AP transmitting data to a MS is the downlink channel. The channel matrix for the downlink channel matrix is H.

With the above in mind, initially the index i is zero, so that block 406 indicates that the identity matrix is used for beamforming at the AP. Consequently, in block 408, the MS observes the channel matrix H. In block 410, the QR decomposition of H is computed in which $H = Q_1 R_1$. Then, assuming that the stopping function is not applied, so that the index is incremented to one in block 416 and control is brought to block 406, the beamformer $Q^*_1$ is applied at the MS, and in block 408 the AP observes the beamformed channel $H^T Q^*_1$. But because $H = Q_1 R_1$, by the unitary property of $Q_1$, it follows that $H^T Q^*_1 = R_1{}^T$. In block 410, the AP now performs a QR decomposition on the observed beamformed channel matrix $R_1{}^T$ as $R_1{}^T = Q_2 R_2$.

If the iterations were now stopped, then $H = Q_1 R_2{}^T Q_2{}^T$ and it is expected that $R_2$ is more "diagonal" than H. In practice, $H = Q_1 R_2{}^T Q_2{}^T$ would be a crude approximation to the SVD of H, so that more iterations would probably be in order. If control were brought back to block 406 after the index is incremented to two, then in block 406 the AP employs $Q^*_2$ as the beamformer and in block 408 the MS observes the beamformed channel matrix $HQ^*_2$. In block 410, the MS would perform the QR decomposition $HQ^*_2=Q_3R_3$. If control is again brought to block 406 after incrementing the index to three, then in block 406 the MS would use the beamformer $Q^*_3$, and in block 408 the AP would observe the beamformed channel matrix $H^T Q^*_3$. In block 410, the AP would perform the QR decomposition to obtain $H^T Q^*_3=Q_4R_4$. If the stopping function 412 were to stop the iterations, then the factorization of H would be $H=Q_3 R_4^T Q_4^T$.

For the example above in which four iterations were considered, in which the index i was incremented from zero to three, the table below summarizes the results. In general, after n iterations, the channel matrix H would be factored as $H=Q_{n-1} R_n^T Q_n^T$.

| Link | Transmission | Observed Channel | QR Decomposition | Effective SVD |
|---|---|---|---|---|
| AP → MS | $\bar{y}_d = H\bar{d}_d$ | H | $H = Q_1 R_1$ | $H = Q_1 R_1$ |
| MS → AP | $\bar{y}_u = H^T Q_1^* \bar{d}_u$ | $R_1^T$ | $R_1^T = Q_2 R_2$ | $H = Q_1 R_2^T Q_2^T$ |
| AP → MS | $\bar{y}_d = H Q_2^* \bar{d}_d$ | $Q_1 R_2^T$ | $Q_1 R_2^T = Q_3 R_3$ | $H = Q_3 R_3 Q_2^T$ |
| MS → AP | $\bar{y}_u = H^T Q_3^* \bar{d}_u$ | $Q_2 R_3^T$ | $Q_2^T R_3^T = Q_4 R_4$ | $H = Q_3 R_4^T Q_4^T$ |

Figure 5:
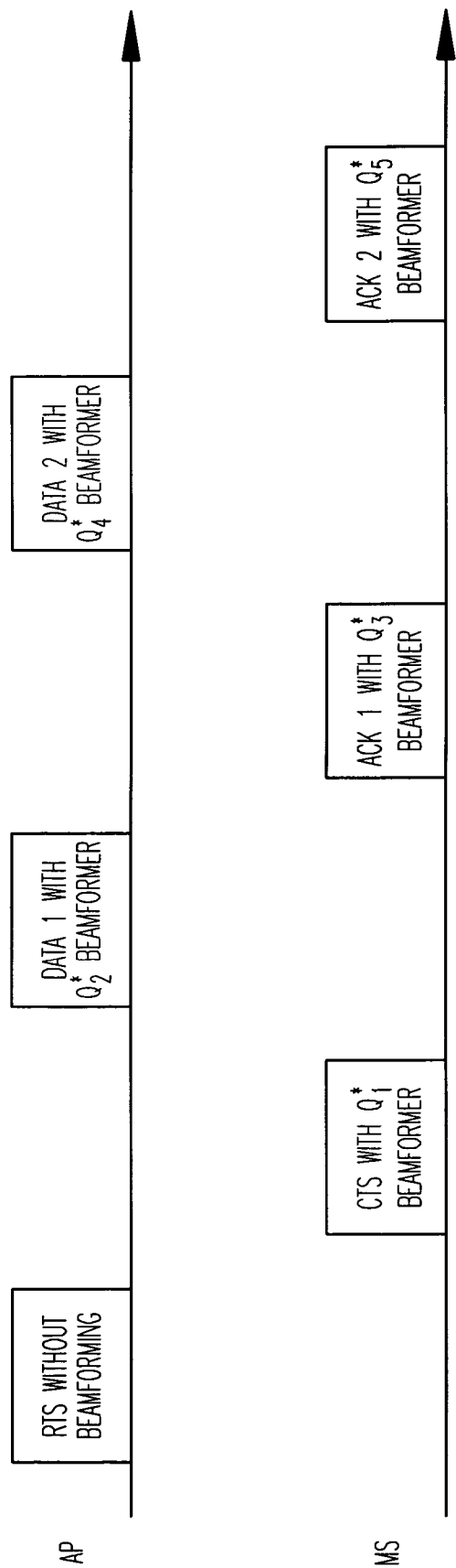
FIG. 5 illustrates a protocol for implementing an embodiment of the present invention.

The cooperative procedure between the two communication devices may be accomplished by a simple protocol. Referring to FIG. 5, for example, a request-to-send (RTS) packet may be transmitted from one device, say the AP, to the other device, say the MS, without the use of beamforming (510). This would correspond to block 406 of FIG. 4. In response, a clear-to-send (CTS) packet may be sent from the MS to the AP, in which now the beamformer $Q^*_1$ is employed (520), corresponding to performing blocks 408 through 410, and then incrementing the index to one and performing block 406 at the MS. In response, a data packet may be transmitted from the AP to the MS using $Q^*_2$ as the beamformer (530). An acknowledgement (ACK) packet may be sent from the MS to the AP using $Q^*_3$ as the beamformer (540). The sequence may then continue, in which data and ACK packets are exchanged between the AP and the MS (550 and 560), in which each iteration follows the flow diagram in FIG. 4. This protocol is illustrated in FIG. 5.

The above is only one particular way in which the beamformed channel information is exchanged between the two communication devices. Any number of protocols may be employed to exchange this information so that the SVD of the channel matrix may be approximated by performing a QR decomposition at each communication device.

In other embodiments, once a communication device has knowledge of the observed channel, it may perform a plurality of QR decompositions before sending signals to another device. By performing such a plurality of decompositions, a better estimate of the SVD may be provided. For example, an access point may have spare computational and time resources, so that it may be able to perform more than one QR decomposition without sending signals to another device, in which the multiple QR decompositions are indicated in the equations below:

$H = Q_1 R_1$, $R_1^T = Q_2 R_2 \to H = Q_1 R_2^T Q_2^T$, $R_2^T = Q_3 R_3 \to H = Q_1 Q_3 R_3 Q_2^T$, $R_3^T = Q_4 R_4 \to H = Q_1 Q_3 R_4^T Q_4^T Q_2^T$, $$H = \begin{cases} \dfrac{Q_1 \ldots Q_{2n-1} R_{2n-1} Q_{2n}^T \ldots Q_2^T}{\hat{U} \quad \hat{\Sigma} \quad \hat{V}^H}, & \text{for odd number of iterations} \\ \dfrac{Q_1 \ldots Q_{2n-1} R_{2n}^T Q_{2n}^T \ldots Q_2^T}{\hat{U} \quad \hat{\Sigma} \quad \hat{V}^H}, & \text{for even number of iterations} \end{cases}$$

In the above equations, the channel matrix $H^T$ is the observed channel from the other device to the device performing the multiple decompositions, and the channel matrix H is the channel from the device performing the multiple decompositions to the other device. The iterations may be stopped at any time. The product of matrices indicated as $\hat{U}$ and $\hat{V}^H$, which are unitary, obtained from a plurality of QR decompositions, provide better approximations than the unitary matrices obtained from a single QR decomposition. The device may use $\hat{V}$ as the beamforming matrix if a signal is to be transmitted to the other device.

Figure 6:
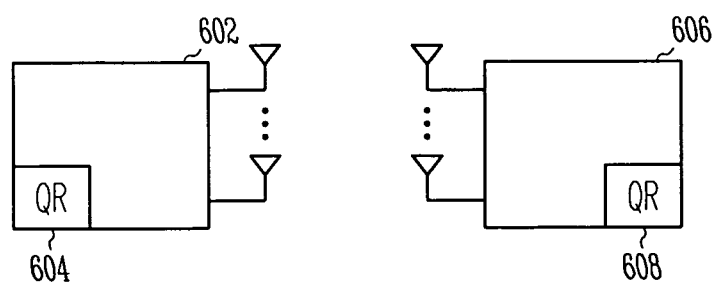
FIG. 6 illustrates at a high level a MIMO system with QR-processing modules to realize an embodiment of the present invention.

MIMO communication devices utilizing minimum mean square estimation or zero-forcing receivers have already been designed with QR decomposition capabilities. This feature is indicated at a high level by the simplified drawing in FIG. 6, were communication device 602 comprises a QR decomposition functional unit 604 and communication device 606 comprises a QR decomposition functional unit 608. The QR decomposition functional unit may be realized by one or more ASICs (application specific integrated circuits). Or, the functionality may be realized by utilizing software or firmware with a processor to run the code. Various other ways may be employed to realize the functionality of QR decomposition. By exploiting these capabilities, embodiments of the present invention are expected to perform SVD of the channel matrix with only a modest amount of additional circuitry.

Note that other types of decompositions, other than a QR decomposition, may be employed in an iterative fashion to approximate a SVD. For example, a sequence of Householder transformations may be employed to provide a matrix with its energy "concentrated" along its diagonals. The QR decomposition embodiment, however, is attractive because it makes use of circuits that already have been designed for MIMO systems.

Figure 7:
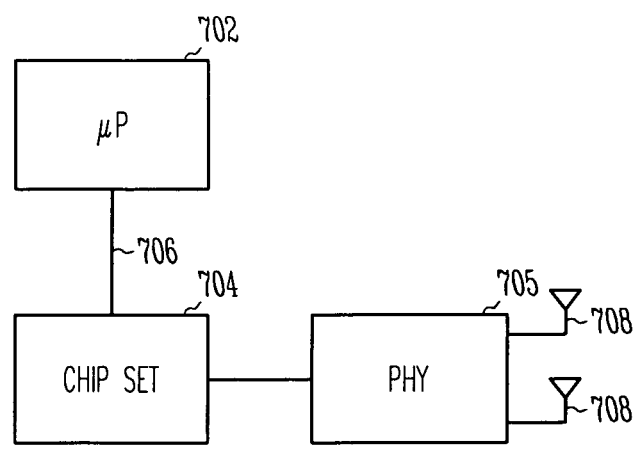
FIG. 7 illustrates at a high level a portion of a computer system to realize an embodiment of the present invention.

The communication devices may be a wireless router or a laptop, but are not limited to such devices. As an example, FIG. 7 illustrates in very simple fashion only a portion of a computer system, such as a laptop, in which microprocessor 702 is in communication with a chipset 704 via front side bus 706. Chipset 704 is in communication with physical layer (PHY) 705, which provides the RF signals to one or more antennas 708. Chipset 704 may comprise more than one integrated circuit, and PHY 705 may reside on one of these integrated circuits. The QR decomposition functionality may reside in chipset 704, or may be performed by microprocessor 702 under software control.

Various modifications may be made to the disclosed embodiments without departing from the scope of the invention as claimed below.

Much of the above discussion was within the context of a wireless communication channel. Embodiments of the present invention, however, are not limited to wireless channels. For some wired communication systems, there may be coupling between transmission lines. For example, in a DSL (digital-subscriber-line) communication system, a plurality of signal lines propagate a plurality of signals from office to office. There may be signal coupling among these signal lines, so that the communication system may be modeled as a multiple-input-multiple-output system. In such cases, the embodiments described herein may find application.

It should be noted that various vectors and matrices appear in the claims, in which for convenience these vectors are indicated as column vectors and various matrices are defined as comprising a sequence of column vectors. It is to be understood that this is done merely for convenience and is not meant to limit the scope of the claims. That is, the various vectors could easily be represented as row vectors, in which case various matrices may be defined as comprising a sequence of row vectors. For example, if a matrix Y is defined as comprising column vectors $y_i$, i=1, ... L, so that Y=[$y_1$ $y_2$ ... $y_L$], and Y is post-multiplied by some matrix P so that the matrix multiplication YP is performed, then a matrix X may be defined as comprising row vectors $y_i^T$, i=1, ... L, so that X=[$y_1^T$ $y_2^T$ ... $y_L^T$]. There is then no conceptual difference between the post-multiplication YP and the pre-multiplication $P^T X$, in which it is recognized that X is merely the transpose of Y. Consequently, it is to be understood that various column vectors, and the associated matrices defined from the various column vectors, are indicated in the claims merely as a convenient way to represent relationships among various signal components.

Throughout the description of the embodiments, various mathematical relationships are used to describe relationships among one or more quantities. For example, a mathematical relationship may express a relationship by which a quantity is derived from one or more other quantities by way of various mathematical operations, such as addition, subtraction, multiplication, division, etc. More simply, a quantity may be set to some known value, such as a real number, which is merely a trivial mathematical relationship. These numerical relationships are in practice not satisfied exactly, and should therefore be interpreted as "designed for" relationships. That is, one of ordinary skill in the art may design various working embodiments to satisfy various mathematical relationships, but these relationships can only be met within the tolerances of the technology available to the practitioner. In the following claims, the word "substantially" is used to reflect this fact. For example, a claim may recite that one resistance is substantially equal to another resistance, or that one voltage is substantially equal to another voltage. Or, a claim may relate one quantity to one or more other quantities by way of stating that these quantities substantially satisfy or are substantially given by a mathematical relationship or equation. It is to be understood that "substantially" is a term of art, and is meant to convey the principle discussed above that mathematical relationships, equalities, and the like, cannot be met with exactness, but only within the tolerances of the technology available to a practitioner of the art under discussion.

What is claimed is:

1. An apparatus comprising a communication device, the communication device comprising:
a receiver configured to provide an observed beamformed channel matrix in response to receiving a first beamformed signal from a beamforming transmitter;
a processor configured to perform a QR decomposition of the observed beamformed channel matrix to provide a unitary matrix, and to determine a goodness of criterion, wherein the processor is further configured to determine that the goodness criterion is not satisfied;
and a beamformer configured to utilize a conjugate of the unitary matrix to transmit a beamformed reply signal to the transmitter if the goodness of criterion is not satisfied;
until the goodness criterion is satisfied, the processor performing one or more successive iterations of the QR decomposition of the observed beamformed channel matrix is performed to provide an updated unitary matrix for each successive observed channel matrix so that for each iteration the beamformer utilizes an updated conjugate of the unitary matrix to transmit a beamformed reply signal to the beamforming transmitter for the one or more successive iterations, and the beamforming transmitter alternately uses identity matrixes for beamforming based on a QR decomposition of an observed current channel matrix of the beamformed reply signal transmitted to the beamforming transmitter.

2. The apparatus as set forth in claim 1, wherein the beamforming transmitter comprises a second communication device, the second communication device comprising:
a receiver to provide a second observed beamformed channel matrix in response to the communication device transmitting the beamformed reply signal;
a processor to perform a QR decomposition of the second observed beamformed channel matrix to provide a second unitary matrix, and to determine a second goodness of criterion; and
a beamformer to utilize the second unitary matrix to transmit a successive first beamformed signal from the beamforming transmitter if the second goodness of criterion is not satisfied.

3. The apparatus as set forth in claim 2, wherein the beamformer of the second communication device utilizes an identity matrix for beamforming to transmit a beamformed signal from which the communication device provides the Observed beamformed channel matrix.

4. The apparatus as set forth in claim 1, wherein the beamformer of the communication device complex conjugates the unitary matrix.

5. A communication method, comprising:
transmitting from a first device a first beamformed signal using an identity matrix for beamforming;
observing at a second device a first observed beamformed channel in response to the first beamformed signal;
performing at the second device a QR decomposition of the first observed beamformed channel to provide a first unitary matrix;
determining at the second device that a goodness criterion is not satisfied;
determining at the second device to perform a further iteration of the QR decomposition of the first observed beamformed channel if the goodness of criterion is not satisfied;
conditionally beamforming with a conjugate of the first unitary matrix to transmit from the second device a second beamformed signal if the goodness criterion has not been satisfied;
observing at the first device a second observed beamformed channel in response to the second beamformed signal;
performing at the first device a QR decomposition of the second observed beamformed channel to provide a second unitary matrix;
determining at the first device whether to further iterate the QR decomposition of the second observed beamformed channel based on the goodness of criterion;
conditionally beamforming with the second unitary matrix to transmit from the first device a third beamformed signal if the goodness criterion has not been satisfied;
and until the goodness criterion is satisfied, alternately performing at the second device and at the first device one or more successive iterations of the QR decomposition of the beamformed channel matrix observed by the respective device to provide an updated unitary matrix so that one or more beamformed data packets are transmitted utilizing an updated conjugate of the unitary matrix for the one or more successive iterations.

6. The communication method as set forth in claim 5, wherein transmitting the first beamformed signal includes beamforming with an identity matrix.

7. The communication method as set forth in claim 5, wherein beamforming with the first unitary matrix includes complex conjugating the first unitary matrix.

8. A communication system, comprising:
a first communication device comprising a beamformer to transmit a first beamformed signal using an identity matrix for beamforming;
and a second communication device comprising:
a receiver to observe a first observed beamformed channel in response to the first communication device transmitting the first beamformed signal;
a QR processor to perform a QR decomposition of the first observed beamformed channel to provide a first unitary matrix, and to determine a goodness of criterion of the QR decomposition;
and a beamformer utilizing a conjugate of the first unitary matrix to transmit a second beamformed signal in response to determining that the goodness of criterion is not satisfied;
the first communication device further comprising:
a receiver to observe a second observed beamformed channel in response to the second communication device transmitting the second beamformed signal;
and a QR processor to perform a plurality of QR decompositions of the second observed beamformed channel to provide a second unitary matrix, and to determine a second goodness of criterion, the beamformer of the first communication device utilizing the second unitary matrix to transmit a third beamformed signal;
until the goodness criterion is satisfied, the second communication device and the first communication device alternately performing for one or more successive iterations the QR decomposition of the beamformed channel matrix observed by the respective communication device to provide an updated unitary matrix so that the beamformer of the communication device utilizes an updated conjugate of the unitary matrix to transmit a beamformed signal to the other communication device.

9. The communication system as set forth in claim 8, wherein the beamformer of the first communication device utilizes an identity matrix for beamforming to transmit the first beamformed signal.

10. The communication system as set forth in claim 8, wherein the beamformer of the first communication device complex conjugates the first unitary matrix.

11. A communication system, comprising:
a beamforming access point to send a first signal using an identity matrix for beamforming; and
a beamforming mobile station to receive the first signal, perform a QR decomposition, and to send a clear-to-send (CTS) packet using a conjugate of a unitary matrix produced by the QR decomposition fix beamforming;
wherein the beamforming access point and the beamforming mobile station alternately perform QR decompositions and utilize conjugates of unitary matrices for beamforming until a goodness of criterion is satisfied; and
wherein, for successive transmissions, the beamforming access point and the beamforming mobile station perform successive QR decompositions to provide updated conjugates of the unitary matrix for transmitting data packets and acknowledgment (ACK) packets, respectively, for each of the successive transmissions.

12. A method, comprising:
transmitting a first signal from a local device to a remote device in a downlink channel, the first signal being transmitted using an identity matrix for beamforming;
receiving at the local device a reply signal from the remote device in an uplink channel, the reply signal being beamformed by the remote device based on a satisfaction of a criterion of goodness for a QR decomposition of an observed beamformed channel matrix of the signal transmitted in the downlink channel, the QR decomposition of the observed beamformed channel matrix providing a unitary matrix; and
transmitting a subsequent signal from the local device to the remote device in the downlink channel, the subsequent signal being beamformed based at least in part on the reply signal received in the uplink channel from the remote device,
until the goodness criterion is satisfied, alternately performing at the remote device and at the local device for one or more successive iterations the QR decomposition of the beamformed channel matrix Observed at the corresponding device provide an updated unitary matrix so that the beamformer of the corresponding device utilizes an updated conjugate of the unitary matrix to transmit a beamformed signal to the other device.

13. A method as claimed in claim 12, wherein the remote device beamforms the reply signal by using a conjugate of a unitary matrix obtained from the QR decomposition as a beamformer for the reply signal in the uplink channel.

14. A method as claimed in claim 12, wherein the subsequent signal is beamformed by using a conjugate of a unitary matrix obtained from QR decomposition as a beamformer for the subsequent signal in the downlink channel.

15. A method as claimed in claim 12, wherein the reply signal comprises a clear to send signal, and the subsequent signal comprises a data packet signal.

16. A method as claimed in claim 12, further comprising repeating said receiving a reply signal and said transmitting a subsequent signal by performing QR decomposition to beamform the reply signals and the subsequent signals until a matrix R of the QR decomposition is sufficiently diagonal.

17. A method as claimed in claim 12, wherein a channel matrix of the downlink channel and a channel matrix of the uplink channel have multiple columns, and wherein the reply signal and the subsequent signal comprise a single spatial stream.

18. A method, comprising:
receiving at a local device a first signal from a remote device in a downlink channel, the first signal being transmitted from the remote device using an identity matrix for beamforming;
transmitting a reply signal from the local device to the remote device in an uplink channel, the reply signal being beamformed based on a satisfaction of a criterion of goodness for a QR decomposition of an observed beamformed channel matrix of the signal received in the downlink channel at the local device and that is used for beamforming the reply signal; and
receiving at the local device a subsequent signal from the remote device in the downlink channel, the subsequent signal being beamformed by the remote device based at least in part on a QR decomposition of an observed beamformed channel matrix of the reply signal transmitted in the uplink channel to the remote device, until the goodness criterion is satisfied, alternately performing at the remote device and at the local device one or more successive iterations of the QR decomposition of the beamformed channel matrix observed by the respective device to provide an updated unitary matrix so that one or more beamformed signals are transmitted to the other device utilizing an updated conjugate of the unitary matrix for the one or more successive iterations.

19. A method as claimed in claim 18, wherein the reply signal is beamformed by using a conjugate of a unitary matrix obtained from the QR decomposition as a beamformer for the reply signal in the uplink channel.

20. A method as claimed in claim 18, wherein the subsequent signal is beamformed by the remote device by using a conjugate of a unitary matrix obtained from the QR decomposition as a beamformer for the subsequent signal in the downlink channel.

21. A method as claimed in claim 18, wherein the reply signal comprises a clear to send signal, and the subsequent signal comprises a data packet signal.

22. A method as claimed in claim 18, further comprising repeating said transmitting a reply signal and said receiving a subsequent signal wherein QR decomposition is performed to beamform the reply signals and the subsequent signals until a matrix R of the QR decomposition is sufficiently diagonal.

23. A method as claimed in claim 18, wherein a channel matrix of the downlink channel and a channel matrix of the uplink channel have multiple columns, and wherein the reply signal and the subsequent signal comprise a single spatial stream.

* * * * *